United States Patent [19]

Copson

[11] Patent Number: 5,237,946

[45] Date of Patent: Aug. 24, 1993

[54] APPARATUS AND METHOD FOR TRANSFERRING MATERIAL TO SUBAQUEOUS LEVELS

[76] Inventor: Alex G. Copson, 3419 Dent Pl., NW., Washington, D.C. 20007

[21] Appl. No.: 765,919

[22] Filed: Sep. 24, 1991

Related U.S. Application Data

[63] Continuation-in-part of Ser. No. 468,918, Jan. 23, 1990, Pat. No. 5,115,751.

[51] Int. Cl.$^5$ .............................................. B63B 35/30
[52] U.S. Cl. ........................................ 114/27; 114/26; 114/270; 414/137.7
[58] Field of Search .................................... 114/26–38, 114/144 B, 264, 265, 270; 405/154; 137/236.1; 141/1; 414/138, 140, 137.7

[56] References Cited

U.S. PATENT DOCUMENTS

| | | |
|---|---|---|
| 2,929,346 | 3/1960 | Perce ..................... 114/331 |
| 3,456,824 | 7/1969 | Smith . |
| 3,595,161 | 7/1971 | Webb . |
| 4,007,505 | 2/1977 | Nowatizki ............... 114/331 |
| 4,307,679 | 12/1981 | Goldsberry et al. . |
| 4,352,590 | 10/1982 | Parker et al. . |
| 4,400,115 | 8/1983 | Biancale et al. . |
| 4,829,923 | 5/1989 | Copson et al. . |
| 4,878,446 | 11/1989 | Vermeulen . |

FOREIGN PATENT DOCUMENTS

| | | |
|---|---|---|
| 69388 | 6/1978 | Japan . |
| 112386 | 9/1981 | Japan . |
| 195487 | 11/1984 | Japan . |
| 198595 | 9/1987 | Japan . |
| 2004817 | 4/1979 | United Kingdom . |
| 2179645 | 3/1987 | United Kingdom . |
| 2184985 | 7/1987 | United Kingdom . |
| 2206543 | 1/1989 | United Kingdom . |

Primary Examiner—David M. Mitchell
Assistant Examiner—Stephen P. Avila
Attorney, Agent, or Firm—Poms, Smith, Lande & Rose

[57] ABSTRACT

A method of disposal of waste material on subaqueous ground is disclosed, and comprises transporting the material to a location above a selected site for disposal, conveying the material in a vessel to a level at, or close to, the subaqueous ground, and depositing the material onto the subaqueous ground. The vessel travels under free-fall conditions for part of its descent. Also provided is a vessel which comprises a generally cylindrical body comprising a containment area having an opening at its upper end for receiving material which is to be transported by the vessel, and having at its lower end means for permitting egress of the material. The vessel is provided, at a position intermediate its upper end and its center of mass, with at least two [wing-like] wing members at diametrally opposed positions; and is also provided with means for pivoting the [wing-like] wing members between a first position in which they lie substantially flat against the exterior of the vessel and a second position in which they extend outwardly from the body of the vessel. In the second position, they present an increased surface area to the surrounding water and provide thereby a decelerating effect on the motion of the vessel when the vessel is moving downwardly within the body of water. A marine system for subaqueous waste disposal is also disclosed, which comprises a ship and a vessel generally as described above.

36 Claims, 13 Drawing Sheets

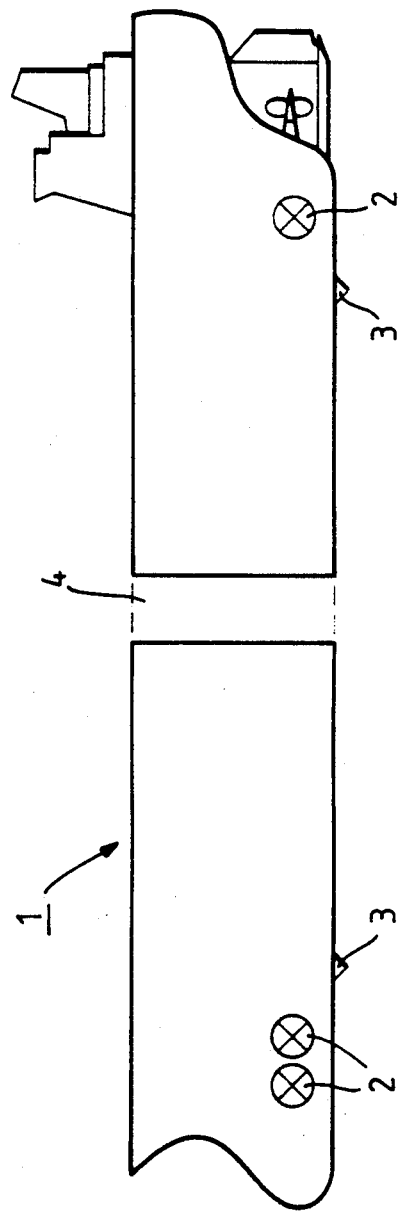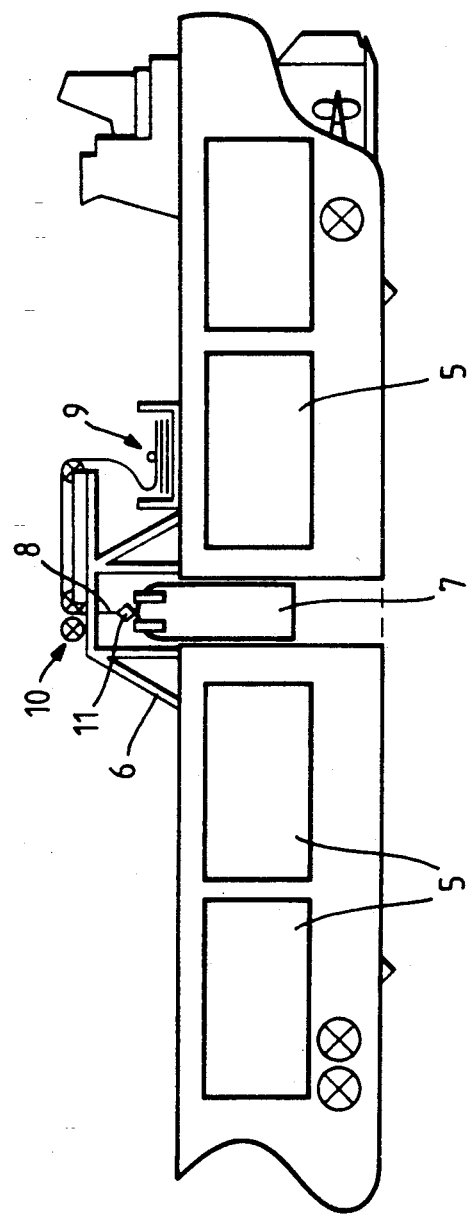

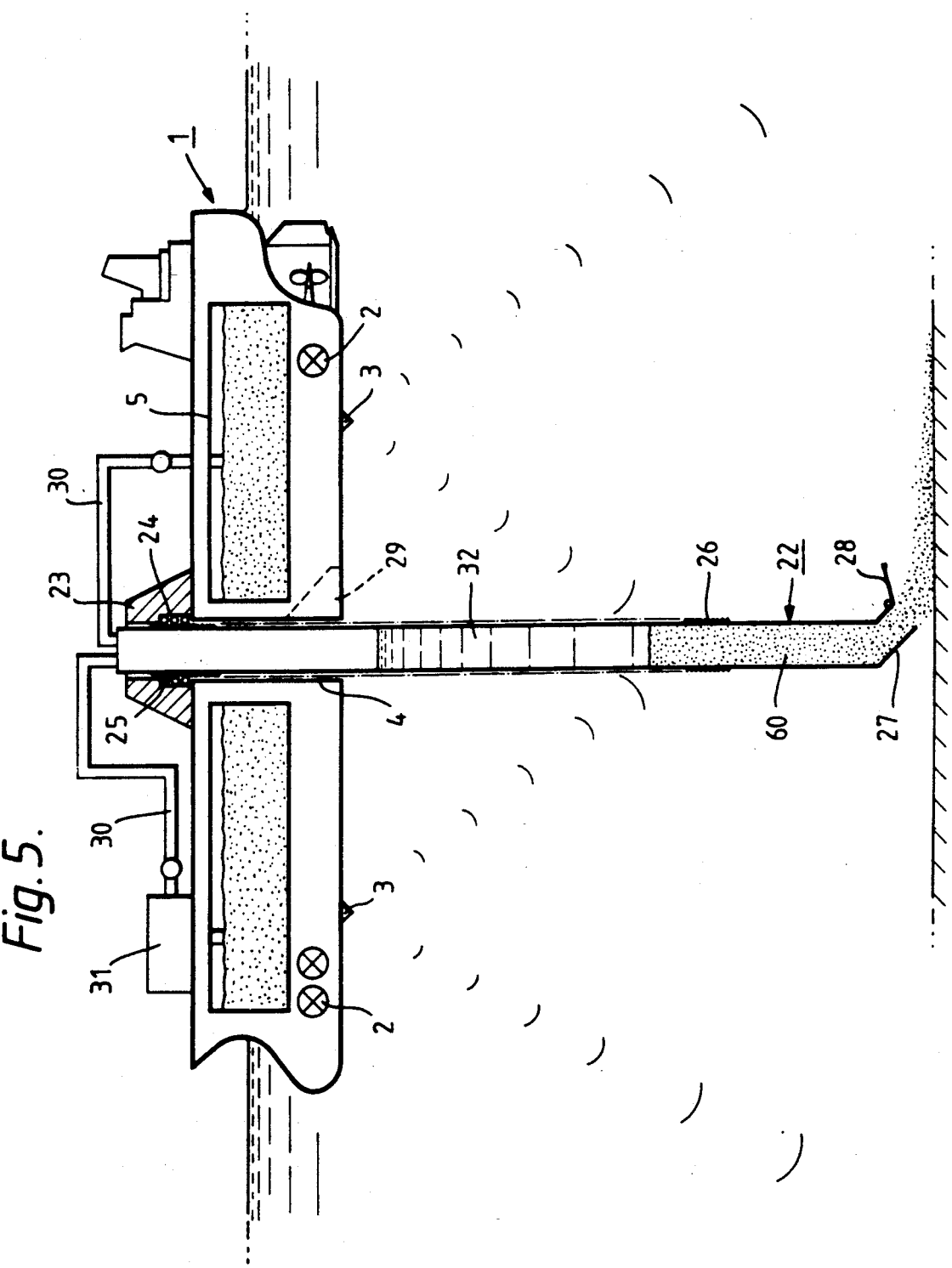

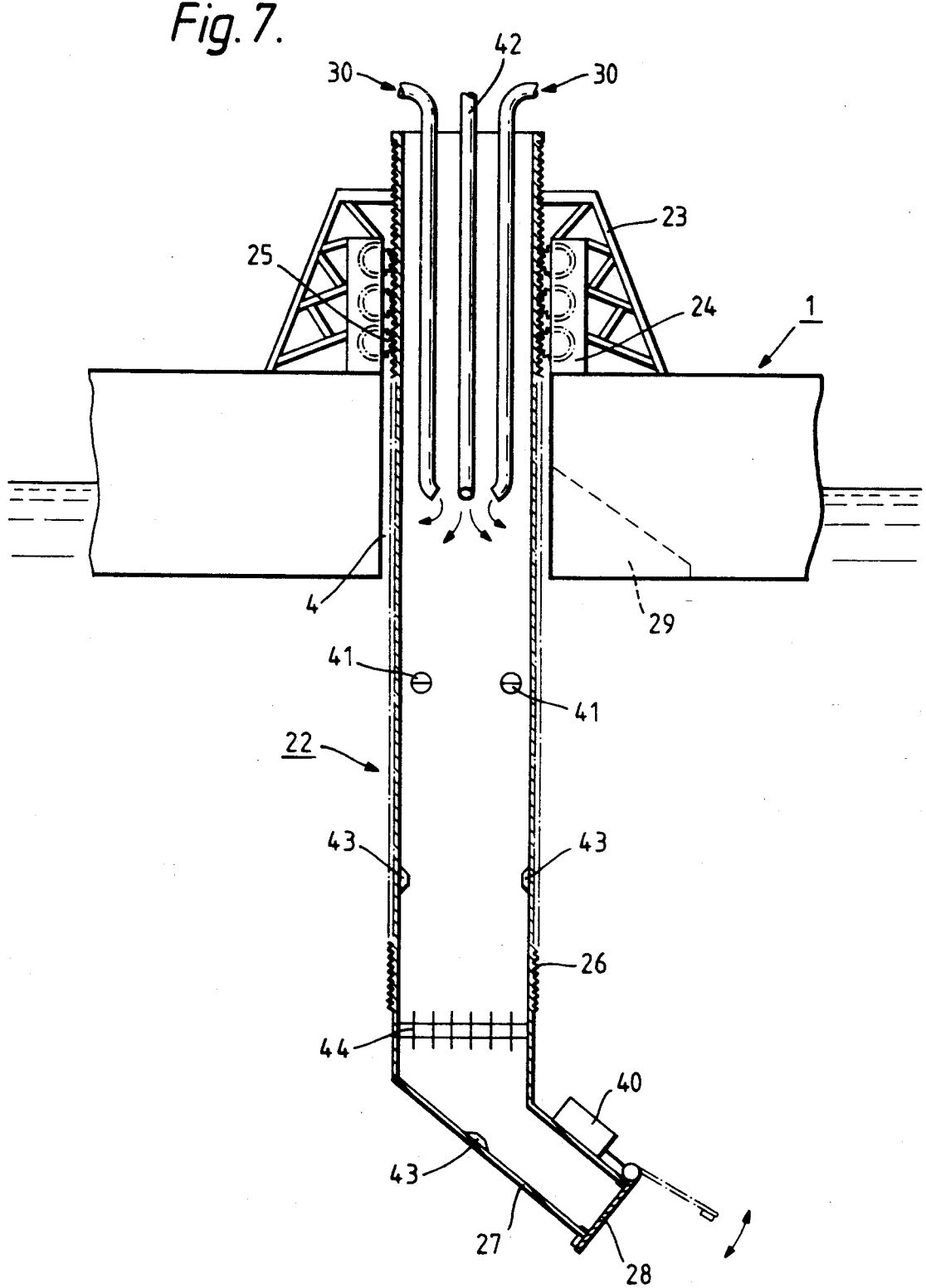

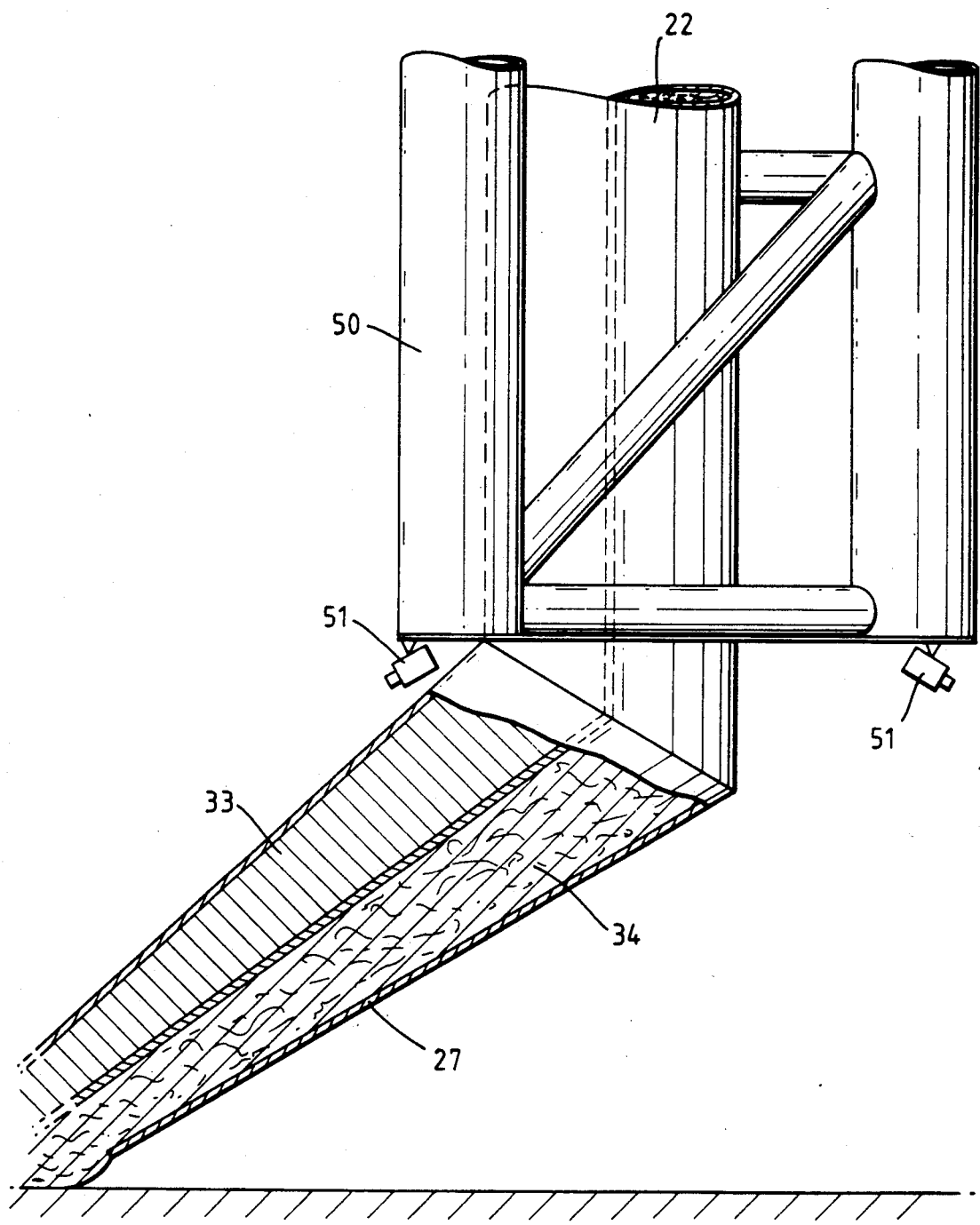

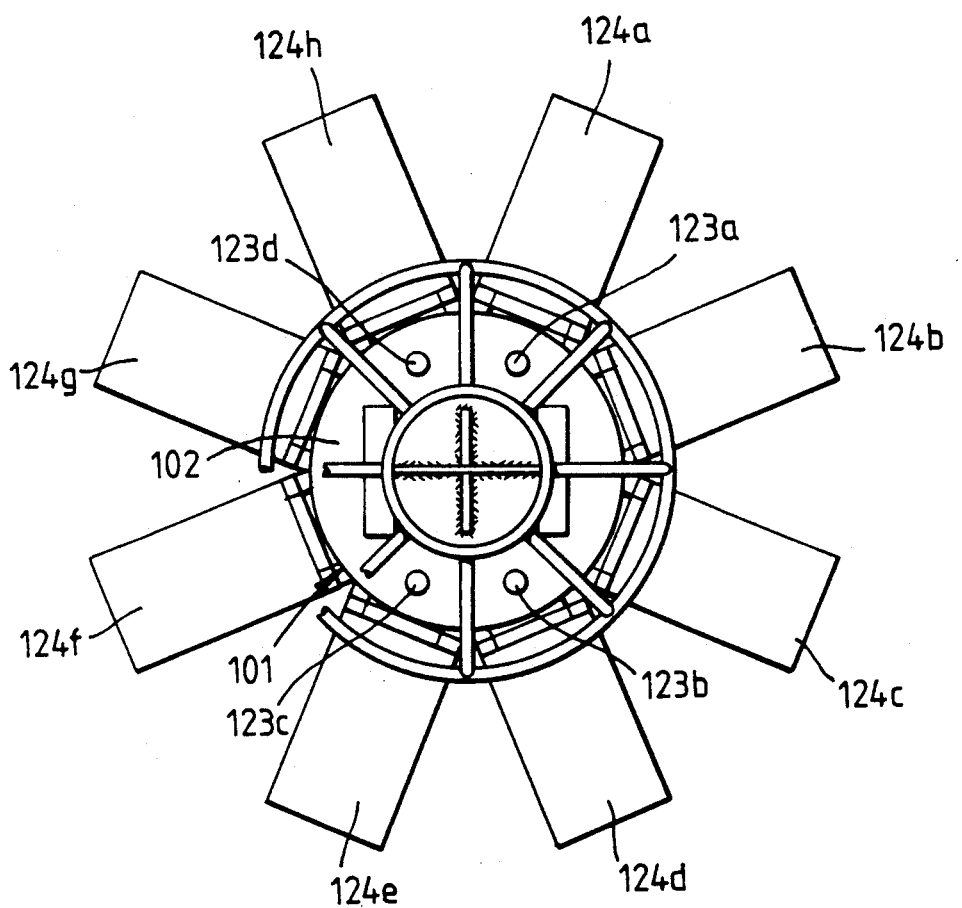

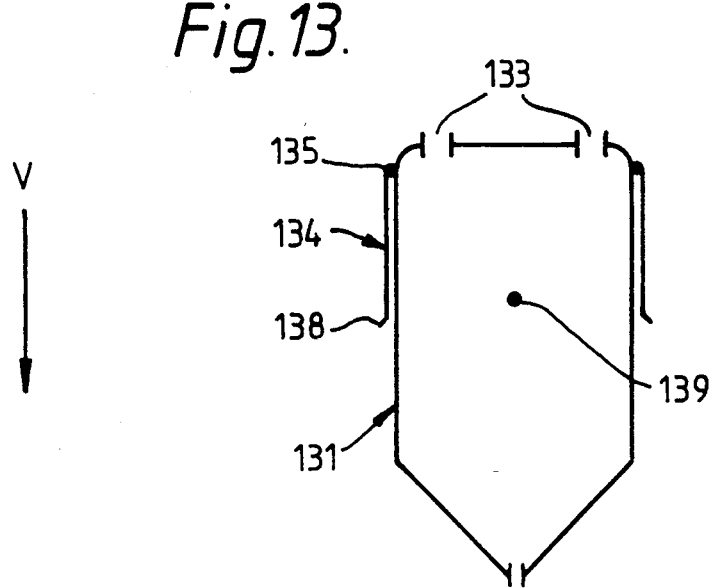
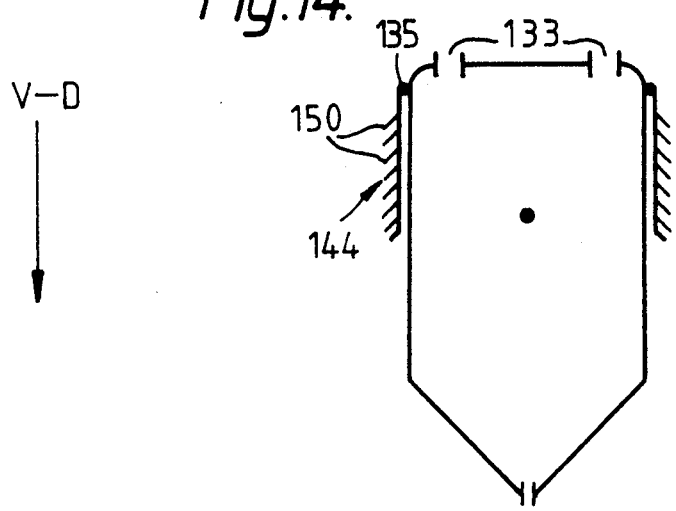
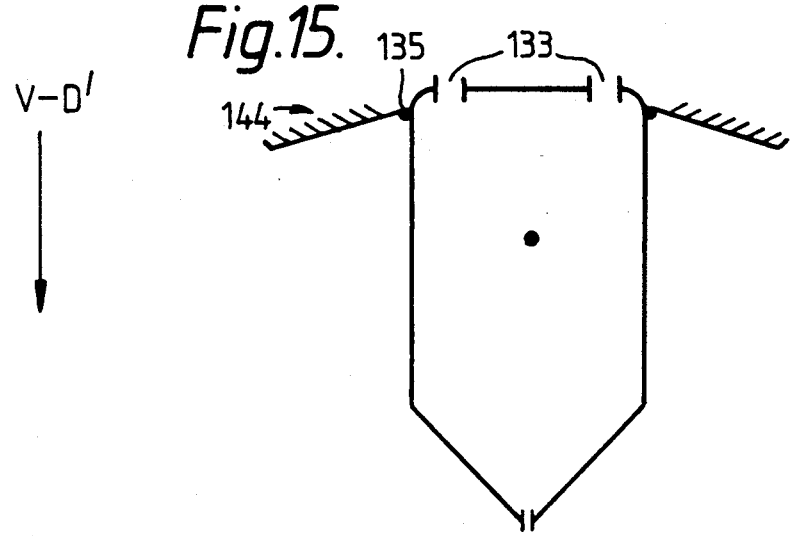

APPARATUS AND METHOD FOR TRANSFERRING MATERIAL TO SUBAQUEOUS LEVELS

RELATED APPLICATION

This application is a continuation-in-part of application Ser. No. 07/468,918 filed Jan. 23, 1990, now U.S. Pat. No. 5,115,751 patented on May 26, 1992.

BACKGROUND OF THE INVENTION

This invention relates to apparatus and a method for transferring material from the surface of a body of water to subaqueous depths, and in particular to deep sea bed locations.

The disposal of waste material is a major problem and is one which is increasing at an alarming rate. In many instances, waste materials are disposed of in the sea. Some materials are simply dumped from ships or pumped into the water. Such surface dumping leads to widespread pollution of the surface waters due to dispersal of waste matter as it sinks towards the sea bed. This can have a deleterious affect on the marine environment over a wide area.

In order to avoid or substantially reduce the risk of wide spread pollution during the disposal of large quantities of waste material in the sea, it is desirable to deposit the waste on or close to the sea bed either at deep water sites (for example 4000-5000 m depth) which have little or no marine life and negligible local currents, or in shallow water sites where a regime known as "subaqueous capping" is operated to localise the deleterious effects of dumping waste in such waters. Under this regime, waste with a high contaminant content ("dirty waste") is first dumped from a ship at a chosen shallow water site, and then waste with a relatively low contaminant content ("clean waste") is dumped over the top. This tends to cover the dirty waste with clean waste, thereby "capping" the dump site.

Particularly when waste material is to be deposited at deep water sites, the transfer of the waste material to its intended disposal location presents a number of difficulties. For economic operation, it is desirable to transfer the maximum quantity of material to the disposal site in the minimum space of time. For deep water sites, continuous disposal through, for example, a pipeline connected to a waste storage facility on board a vessel is not practicable.

An object of the present invention is to provide apparatus and a method for transporting material from the surface of a body of water to a subaqueous level (typically the sea bed) in an efficient manner.

The process of waste disposal preferably takes place from a ship which may be held stationary over a selected subaqueous site by means of a dynamic positioning system comprising thrusters and satellite navigational aids. The ship advantageously has sensors (such as sonar transponders) mounted beneath the hull which allow monitoring of the sea bed and monitoring of any objects beneath the ship.

SUMMARY OF THE INVENTION

According to one aspect of the present invention, there is provided a method of disposal of waste material on subaqueous ground substantially without said material coming into contact with the surrounding water, which comprises transporting said material to a location above a selected site for disposal, conveying said material in a vessel to a level at, or close to, said subaqueous ground, and depositing said material from said vessel onto said subaqueous ground, wherein said vessel travels under free-fall conditions for part of its descent to said level.

Preferably, the vessel travels under free-fall conditions for a first period, and thereafter is decelerated during a second period as it approaches the subaqueous ground, the duration of these periods being calculated as a function of depth. The calculation of these two periods may be performed prior to, or during, the descent of the vessel. The vessel is preferably provided with water jets affixed so as to point in a downward direction. These water jets may be used to form a hollow in the sea bed into which the waste material may be deposited. To aid deposition of the material, the vessel is advantageously provided with vent apertures equipped with non-return valves, which, in use, permit water to enter the vessel, displacing the material which is being deposited, but which prevent egress of the material. These apertures are open when the waste material is deposited in order to equalise the hydrostatic pressures inside and outside the vessel and thus to increase the rate of deposition of said material. These vent apertures are preferably left open as the vessel is drawn back up to the surface of the water so as to minimise water resistance.

According to a second aspect of the present invention, there is provided a vessel for transporting a material from a first location at the surface of a body of water to a second location at a predetermined subaqueous level, for example at the sea bed, which vessel comprises a generally cylindrical body comprising a containment area and having an opening at its upper end for receiving material which is to be transported by the vessel, and having at its lower end means for permitting egress of material held within the containment area once said vessel has reached its predetermined second location; wherein the vessel is provided, at a position intermediate its upper end and its centre of mass, with at least two wing-like members located on the exterior surface of the vessel at diametrally opposed positions; and is provided with means for pivoting said wing-like members between a first position in which they lie substantially flat against the exterior of the vessel and a second position in which they extend outwardly from the body of the vessel so as to present an increased surface area to the surrounding water and to provide thereby a decelerating effect on the motion of the vessel when the vessel is moving downwardly within the body of water.

Preferably, the wing-like members are attached to the body of the vessel relatively close to the upper end thereof, for example at a position spaced from the upper end of the vessel by an amount equal to a value in the range from one tenth to one third of the axial length of the vessel. It is also preferred for the wing-like members to pivot upwardly and outwardly when moving from their first position to their second position. This arrangement maintains better stability during the descent of the vessel both during its normal descent velocity phase and when it is subject to the decelerating effect of the wing-like members.

In one embodiment, the body of the vessel itself, or the outer surface of the wing-like members, are provided with baffles which serve to modify the "free fall"

velocity of the vessel as it descends from the surface of the body of water. These baffles may be fixed in orientation, or they may be under active control to permit them to move from a "feathered" arrangement, in which they present minimal area against the water, to an open position in which they present maximal area to the water.

Advantageously, there are two or more pairs of opposed wing-like members located at the same axial level on the vessel.

The wing-like members may be generally planar or they may be curved to correspond to the curvature of the exterior of the vessel body. Additionally, in some embodiments, the or each of the wing-like members may terminate in a short flange which can, for example, extend obliquely away from the body of the vessel when the wing-like members are in their closed (i.e. streamlined) position.

The opening or openings in the upper section of the vessel preferably include one-way vents which permit material to enter the vessel while preventing any upward movement of material from inside the vessel. These vents permit hydrostatic equalisation during descent of the vessel from its sea surface location to the position at which its contents are to be evacuated.

The lower end of the vessel is preferably formed to include doors which hinge outwardly to permit egress of material from within the vessel. The vessel preferably carries a control pack which allows remote or automatic operation of the doors. As the material exits via the open doors at the base of the vessel, the one-way vents at the upper end of the vessel may be used to allow water to enter the vessel, maintaining hydrostatic equalisation during the emptying operation. The containment body preferably has its internal surface provided with a non-stick coating.

According to a third aspect of the present invention, there is provided a marine system for disposal of material on subaqueous ground substantially without said material coming into contact with the surrounding water, which comprises a ship; a vessel carried by said ship adapted to transport said material to the subaqueous ground, said vessel being provided with at least two wing-like members located on the exterior surface of the vessel at diametrally opposed positions; said wing-like members being provided with means for pivoting between a first position in which they lie substantially flat against the exterior of the vessel and a second position in which they extend outwardly from the body of the vessel so as to present an increased surface area to the surrounding water and to provide thereby a decelerating effect on the motion of the vessel when the vessel is moving downwardly within the body of water. Preferably, said vessel includes vent apertures provided with non return valves which, in use, permit water to enter the vessel but prevent egress of said material therefrom.

Alternatively, the vessel is a bucket, which may be arranged to deposit the material through a hinged door at its base. This hinged door may be opened and closed by hydraulic or pneumatic rams. The bucket may be conveyed to the subaqueous ground by a rope, cable or chain and preferably has its internal surface provided with a non-stick coating.

During disposal the ship may be held on station at the disposal site by means of satellite navigational aids and thrusters and also by means of sensors comprising sonar transponders.

Preferably the material is subjected to processing prior to its transfer into the vessel, but may be subjected to processing either during the step of conveying the material to the subaqueous ground or while it is in the vessel before being conveyed to the subaqueous ground. This treatment is preferably a chemical treatment which may comprise flocculation and/or coagulation. The chemical reagents or additives may be injected into the material through one or more nozzles and may be mixed into the material by an homogenising grating. The material may comprise dredged spoils, contaminated soil, flyash, slurry or sewerage.

According to another aspect of the present invention, there is provided a method of transferring material from a first location at the surface of a body of water to a second location at a predetermined subaqueous level, which method comprises: (a) placing the material into a vessel as defined hereinabove; (b) allowing the vessel to fall freely from its first location through the body of water for a predetermined distance; (c) thereupon moving the wing-like members of said vessel from their first position towards their second position so as to decelerate the descent of the vessel; (d) controlling the rate of descent of said vessel to permit it to arrive gently at said second location; and (e) discharging the contents of the vessel.

According to a further aspect of this invention, the vessel for transporting the waste material is a hollow tube, which may be divided longitudinally to provide separate channels for passage of the first material and the second material. This hollow tube may be disposed within a frame which may be triangular in section. Advantageously, the tube has cameras mounted thereon for visual monitoring of the disposal of the material. The hollow tube may be lowered to a level at, or close to, the subaqueous ground by drive means engaging the periphery of the tube.

DETAILED DESCRIPTION OF THE DRAWINGS

For a better understanding of the invention, and to show how the same may be put into effect, reference will now be made, by way of example, to the accompanying drawings, in which:

FIGS. 1(a) and 1(b) are schematic sections of a first embodiment of a ship for disposal of waste in accordance with the invention;

FIG. 2 illustrates schematically a section through a container for waste disposal;

FIGS. 3(a) to (d) illustrate a sequence using the container for waste disposal;

FIGS. 4(a) to (d) show in detail part of the sequence for waste disposal using the container.

FIG. 5 is a schematic sectional view of second embodiment of a ship for disposal of waste in accordance with the invention;

FIG. 7 is a schematic cross sectional view showing details of part of the ship shown in FIG. 5;

FIG. 9 is a schematic cross section showing details of the preferred form of hollow tube of FIG. 8;

FIGS. 11a and 11b are plan views from above of the vessel of FIG. 10 in two different configurations;

FIGS. 13-15 illustrate schematically the use of a vessel such as shown in FIGS. 10 and 11.

Figure 2:
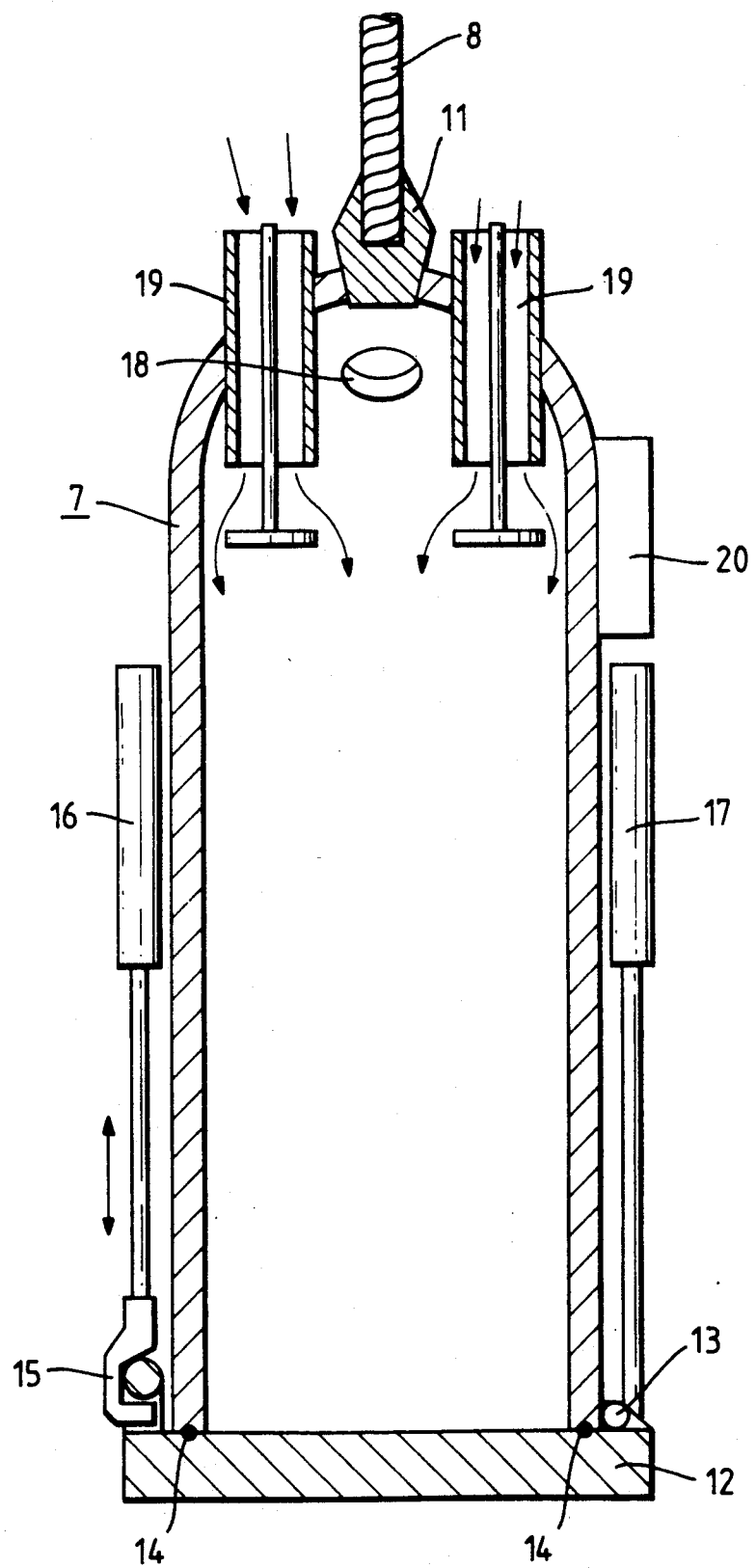
Figure 3B:
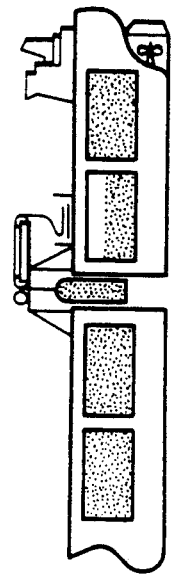
Figure 3A:
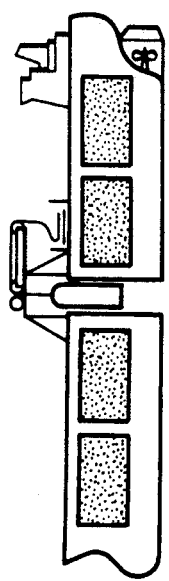
Figure 3D:
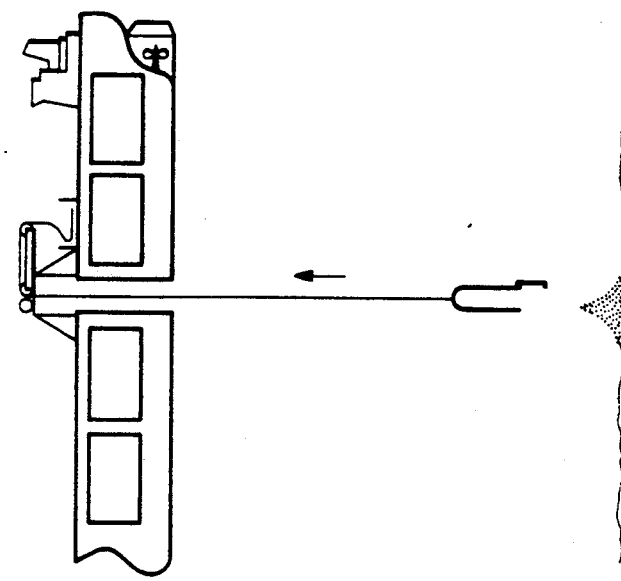
Figure 3C:
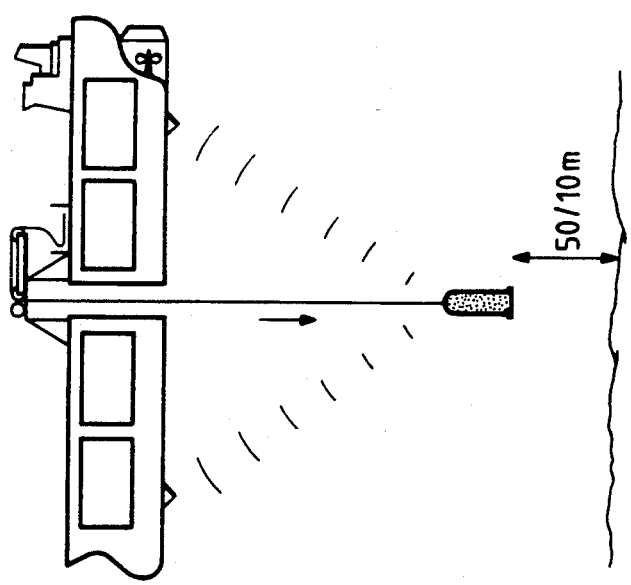

Referring now to FIG. 1(a), a suitable waste disposal vessel would, for example, be a sea going ship 1 of about 40,000 tonnes displacement. The ship has a dynamic positioning system using thrusters 2 to allow it to hold station over a selected seabed site during disposal operations. The ship also has sensors 3 (such as sonar transponders) mounted beneath the hull which allow monitoring of the seabed and monitoring of any objects beneath the ship. There is a hole or moon pool 4 formed through the hull of the ship and opening into the sea beneath the ship; this moon-pool 4 allows passage of a container or vehicle for waste material through the body of the ship and into the sea below.

As shown in FIG. 1(b) according to a first embodiment of the invention the ship has storage tanks 5 for carrying waste material. On the deck there is an A-frame gantry 6 which straddles the moon-pool. A container 7 is supported by a tether 8. The tether is a cable, chain or rope (e.g. "Kevlar" (trade mark)). If the tether is a cable, it may be wound on a reel (not shown). Preferably, the tether is a rope, and in this case the rope can be coiled in a rope store 9. The rope passes via a traction unit 10 to be attached to the container at an attachment swivel 11. The tether is sufficiently long to allow lowering of the container to the seabed; the container can be winched back to the ship from the seabed by means of the tether and the traction unit. The tether has a design strength sufficient to support the weight of a container and its contents (e.g. a breaking strain of several thousand tonnes) and should be designed to be capable of withstanding considerable stretching forces.

The container 7 shown in FIG. 2 has a casing of generally closed cylindrical shape and which defines a space for containing waste materials. The container is designed to be hung from the tether 8 by means of the attachment swivel 11. The base or bottom end of the container, opposite the swivel attachment, is closable by a door 12 mounted on a hinge 13. Seals 14 are provided between the casing ends and the door. A lock mechanism 15 is provided to releasably engage part of the door and there is a ram 16 connected to the lock mechanism to lock or unlock the sealing of the door. A second ram 17 is attached to the door in the vicinity of the hinge and is used to close the door.

A loading port 18 is provided in the upper part of the casing by means of which waste material may be loaded into the container. The loading port can be sealed after the container is loaded.

Also in the upper part of the container are mounted vent apertures fitted with non-return valves 19. The non-return valves provide passages for access into the interior of the container but prevent the exit of material from the container through the vents.

The container of this example is fabricated from steel, has a mass of about 120 tonnes and an internal capacity of about 2500 m³. This container could, for example, hold about 4000 tonnes of solid waste such as contaminated soil, dredged spoil, flyash and the like. Alternatively, the container could hold liquid wastes or slurries (e.g. sewerage sludge of about 5% solids by weight).

A method of waste disposal using the container will now be described by way of example, with reference to the use of a container of the type illustrated by FIG. 2.

Referring to FIG. 3, a general sequence of operation will be described. The ship is loaded with waste material and is taken to a deep water site suitable for waste disposal, FIG. 3(a). Waste material is then loaded into the container whilst the container is held within the moon-pool of the ship, FIG. 3(b). The filled container is sealed and is then lowered towards the seabed on the tether. The ship is maintained in position by the dynamic positioning system. The position of the container relative to the ship and relative to the seabed is monitored during deployment of the container, FIG. 3(c).

As the container nears the seabed its descent is slowed so that the descent is arrested before it reaches the seabed. The container should stop about 10-50 m above the seabed.

The container carries a control pack (FIG. 2, numeral 20) which allows remote operation of the ram 16 to unlock the door of the container. As the door drops open under the weight of the contained waste, the waste material drops down to be deposited onto the seabed. The load on the tether is thereby reduced and any stretching of the tether will be reduced tending to allow the container to rise somewhat towards the surface. The tether is winched in to complete the retrieval of the container into the ships moon-pool, FIG. 3(d).

FIG. 4 shows in more detail some features of the sequence for waste disposal according to this embodiment of the invention. When the descent of the container is arrested just above the seabed, remote signalling can be used to check that the disposal system is ready for operation, FIG. 4(a). As shown in FIG. 4(b), as the door is released the contained material drops as a mass to the seabed under the influence of gravity. In order that the release of the waste material is not held back by the creation of a vacuum in the upper part of the container 21, the one way valves open as the waste drops. The cavity formed behind the waste material is flooded with sea water which replaces the expelled material.

Figure 4A:
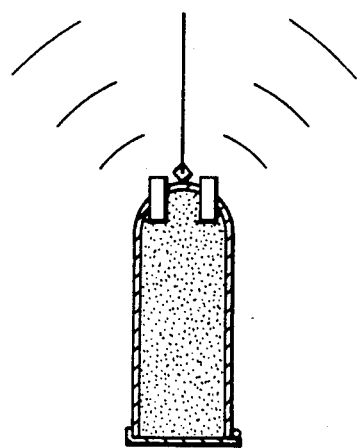
Figure 4B:
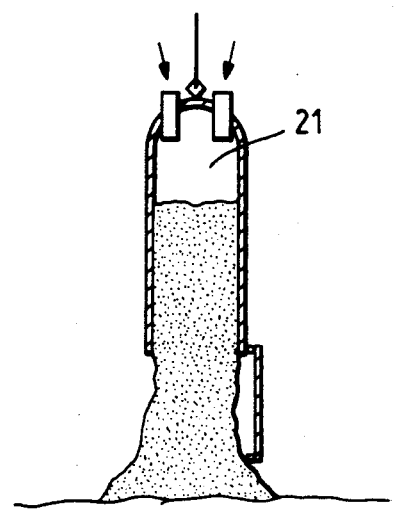
Figure 4C:
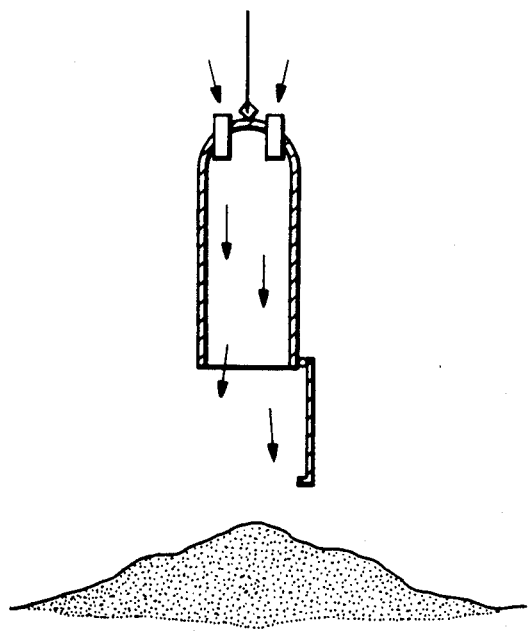
Figure 4D:
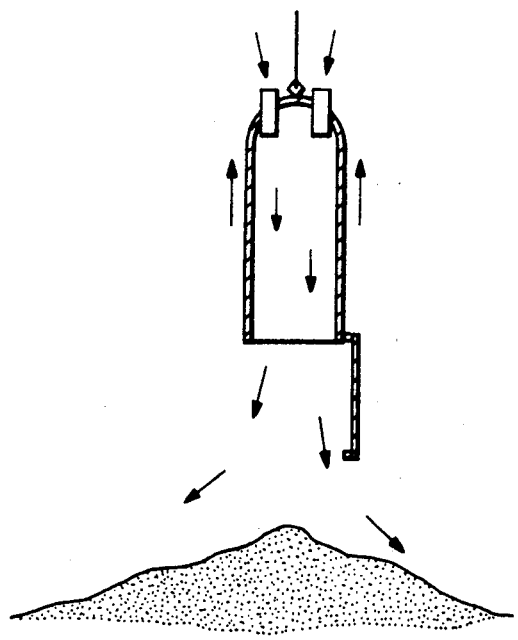

As the sea water rushes into the container it tends to flush the waste material out through the open door, FIG. 4(c). As shown in FIG. 4(d), further flushing of the inside of the container occurs by the passage of seawater through the vents via the one way valves as the container is raised towards the surface with the door remaining open. Any traces of waste material will tend to be washed out of the container before the container gets near to the water surface.

By using this form of the invention it is possible to deposit a large mass of waste material directly onto the seabed at great depth without risk of polluting the sea water through which the material has had to pass on its journey from the surface to the seabed.

Various additional features may be included within the scope of this embodiment of the invention. For example, the inside surface of the container may be polished or treated with "non-stick" material in order to assist the smooth expulsion of the waste from the container at the seabed. Furthermore, the waste may have added to it various treating agents, e.g. chemical additives such as flocculants and/or stabilizers. The treating agents may be added to the waste material as it is loaded into the container, but alternatively there could be inlet ports in the casing of the container for introducing treating agents directly into the material. In some cases it is envisaged that the container will be filled to maximum capacity with waste material, and in other cases the container might be part-filled with sea water and the waste material then added thereto.

In describing a second embodiment of the invention, reference will be made to FIG. 5. Passing through a portion of the hull of the ship there is a moon-pool 4. In the moon-pool is mounted an elongate hollow tube 22 of circular cross section. On the deck of the ship, over the moon-pool, there is a gantry 23 housing a driving mechanism 24 which engages the periphery of the tube and can operate to control raising and lowering of the trunk relative to the hull of the ship. The driving mechanism in this embodiment comprises a set of toothed drive wheels 25 which engage notched portions 26 on the outer surface of the tube.

At the lower end of the tube there is an exit chute 27 in the form of an extension of the tube angled rearwardly relative to the ships hull. The chute is closable by a hinged door 28. When the tube is raised to its maximum extent a major portion of the tube projects above the deck of the ship, and the chute is received in a correspondingly shaped recess 29 in the underside of the hull.

The ship has sensors 3 (e.g. sonar transponders) to measure the water depth below the hull. The information received is used to ensure that when the tube is in a lowered position it does not ever actually touch the bottom. The ship has a dynamic positioning system in which satellite navigational aids are used to accurately locate the ship and thrusters 2 are used to maintain the ship's position over a selected subaqueous site.

The ship will travel to and from the selected site with the tube in the raised position and will lower the tube only at the site. When the tube is in the lowered position, waste material may be conveyed from the holds to the tube via conduits 30. In the illustrated embodiment there is a chemical treatment plant 31 on the deck through which waste material passes in the conduit between the hold and the tube. As shown, the tube holds a portion of waste material 60 above which there is a head of water 32. As an alternative the tube could contain waste material only. In any case, when the door of the exit chute is opened, as the ship moves slowly forward the waste material can pass out of the tube to be laid in a continuous strip on the seabed below the ship. Because the positioning system on the ship gives an accurate location for each strip of waste laid on the bottom, it is possible to repeat the process whereby successive strips are laid side by side or one on top of another to achieve subaqueous capping. Alternatively, a single ship may deposit both materials in a single traverse provided that it is suitably equipped, e.g. with two tubes instead of the single tube 22 shown in FIG. 5.

Figure 6:
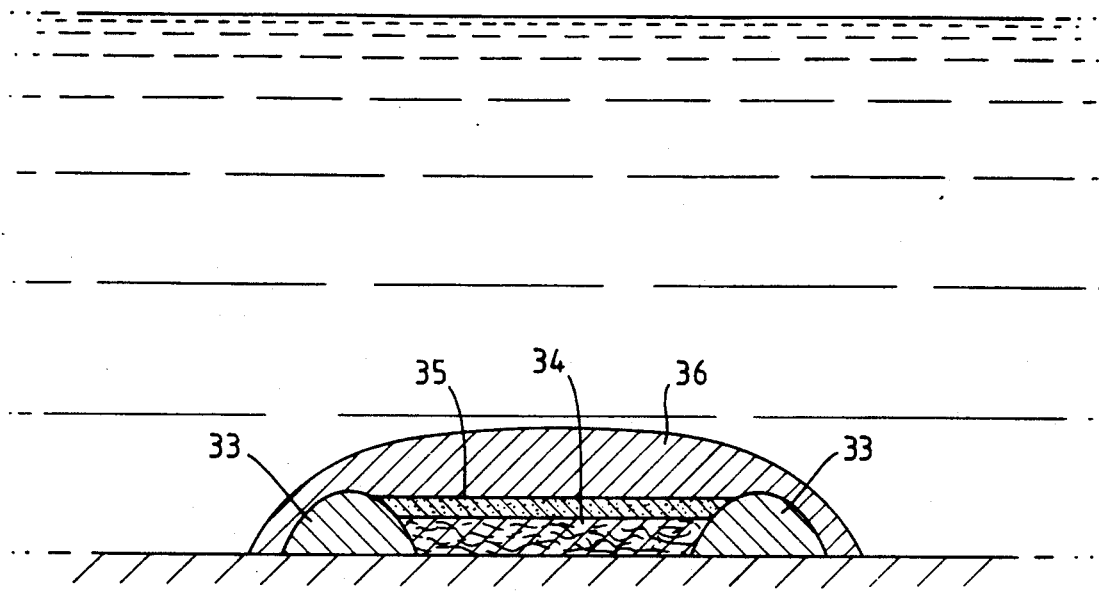
FIG. 6 is a schematic cross section through a subqueous capped waste disposal site.

FIG. 6 shows how a capped site could be built up by first laying a surrounding wall 33 of clean waste, then laying successive strips of dirty waste 34, 35 within the wall, and finally covering over the dirty waste with a cap of clean waste 36. The site may be built up on a grid plan by criss-crossing the site with the ship. The disposal site could, for example, be a square with sides about 1 km in length. By using this technique there is an improvement in the chances that the waste material (especially contaminants from the dirty waste) will not be dispersed in the surrounding water.

Figure 8:
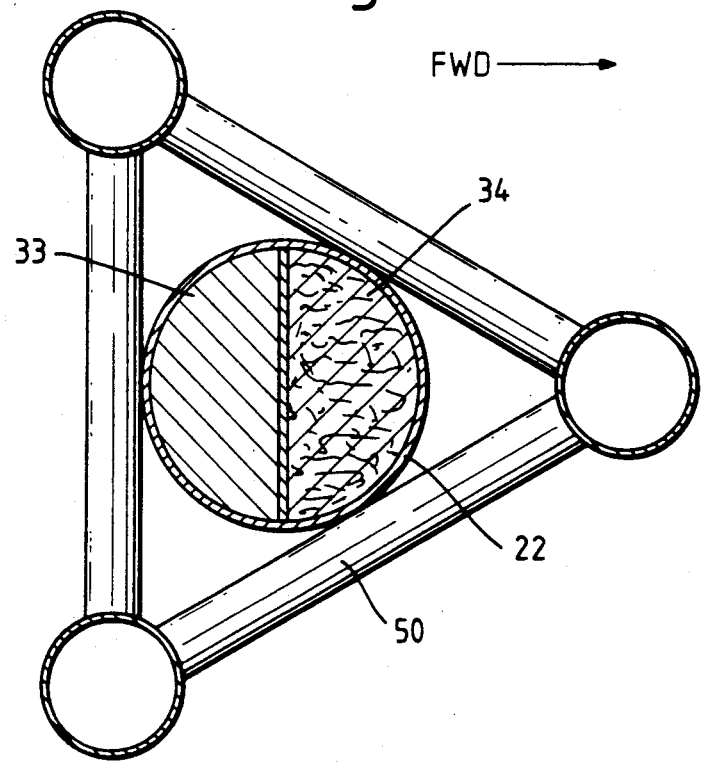
FIG. 8 is a plan view of a preferred form of the part shown in FIG. 7.

Preferred features of this embodiment of the invention are shown in FIGS. 7, 8 and 9.

Referring to FIG. 7, the exit chute 27 is provided with a hydraulic ram 40 to control opening and closing of the door 12.

The tube is provided with one way valves 41 which will prevent escape of matter from inside the tube but which can allow the surrounding water to flow into the tube as waste flows out in order to maintain essentially constant the contained total volume inside the tube.

It is considered particularly desirable that waste material should be treated prior to laying at the subaqueous site. The presently preferred form of treatment is the incorporation of chemical reagents or additives to stabilise waste. Examples of such additives are flocculants and coagulants.

These additives may be mixed with the waste in a plant 31 on deck, but may be added by an injector 42, as shown in FIG. 7, as the waste enters the top of the tube. Additional injector nozzles 43 for applying chemical additives may be located at various parts of the tube and adjacent the exit chute.

In order to ensure thorough mixing of the waste with any additives an homogenising grating 44 may be placed across a lower part of the tube. It is expected that best results will be achieved in the use of the apparatus and method of this second embodiment of the invention if the waste which exits the chute is in the form of a cohesive coagulated paste like mass.

Another preferred form of this embodiment of the invention is shown in FIGS. 8 and 9. The hollow tube 22 is divided into the two sections down its length, one section containing clean waste 33 (for example, clean dredge spoil) and the other containing dirty waste 34 (for example, flocculated contaminated waste). The tube is housed in a triangular sectioned frame 50, which extends down the tube to the exit chute 27 (FIG. 9) where cameras 51 are mounted for monitoring the release of waste and the disposal site.

In the exit chute 27 the two sections of the tube are arranged so that the section containing the clean waste is disposed above the section containing the dirty waste. This ensures that as dirty waste is released from the tube clean waste is dumped on top of this dirty waste and it is thereby immediately capped.

It is to be understood this second embodiment of the invention may be put into practice either in a batch-mode or as a semi-continuous process. In the first case, as each batch of waste is loaded into the tube it is then laid onto the seabed. In the second case, waste is fed to the tube at a rate which substantially balances the rate at which waste is laid at the subaqueous site. An equilibrium is achieved whereby in operation the tube is kept part-filled. In this case, laying could be carried out continuously until such time as the supply of waste from the holds is exhausted.

Figure 10:
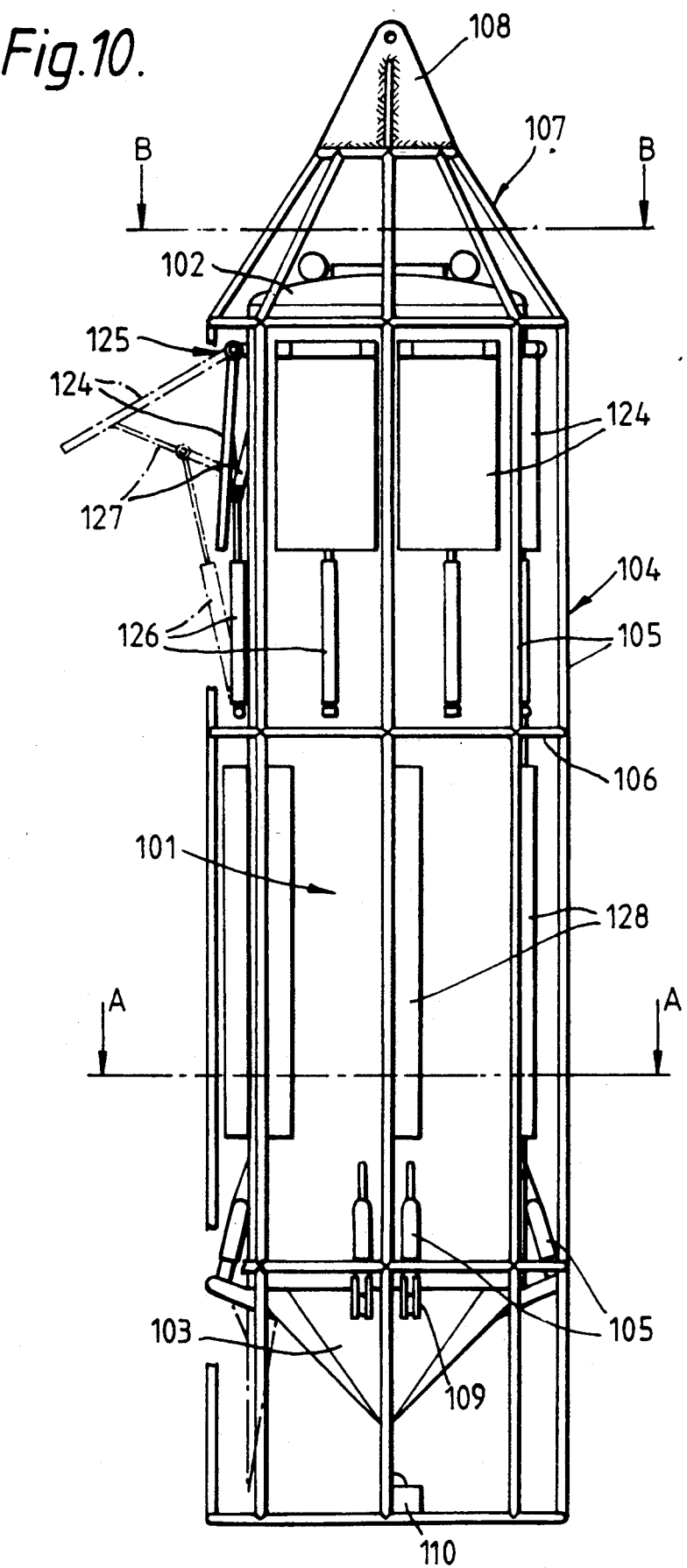
FIG. 10 is a schematic view of one embodiment of a vessel in accordance with this invention.

Referring now to FIG. 10, the vessel comprises a main containment body 101 having a domed upper surface 102 and a somewhat conical lower end 103 which incorporates "clamshell" doors. The generally cylindrical body 101 is surrounded by an open framework 104 of struts which include vertical members 105 and horizontal members 106. The struts are preferably in the form of metal tubes or pipes coated with ultra high molecular weight polyethylene.

In the vicinity of upper surface 102 of containment body 101, the struts 105 adopt a generally conical configuration as at 107 and terminate in a lifting/lowering sling 108.

The vessel also carries eight wing-like members 124a-124h one of which is shown in its opened configuration in FIG. 10. Each of the wings 124 is attached to the side of the vessel by means of a hinged mechanism such as 125. Each of the wings 124 is operated by a hydraulic ram 126 which is linked to its respective wing 124 by an arm 127. The hydraulic rams 126 are mounted just above the mid-point of the vessel. With this arrangement, wings 124 are located close to the top of the vessel and well above its centre of mass.

At the lower end of the containment device, struts 105 carry water jets 109. An altitude sonar 110 is also provided at the lower end of the vessel.

Stored energy accumulators 128 are carried by the framework 104 in a region below the top surface 102 of containment body 101.

Referring now to FIG. 11a, the top of the vessel is shown in schematic plan view with all of the wings 124a-124h in their opened configuration. The upper surface 102 of containment body 101 includes four one-way vents 123a-123d which permit flow into the vessel but prevent flow from within to without.

Figure 11B:
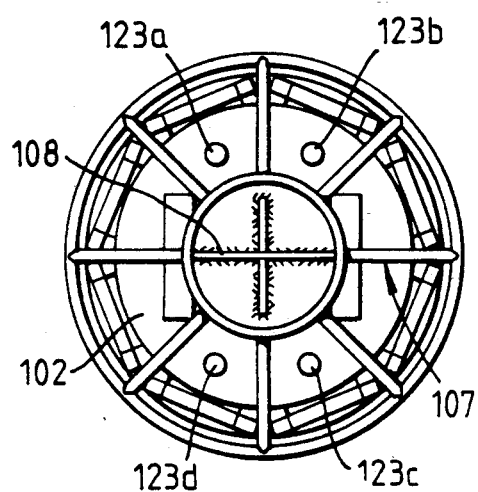

FIG. 11b is a plan view corresponding to that of FIG. 11a, but with the wing-like members 124a-124h in their closed configuration.

Figure 11C:
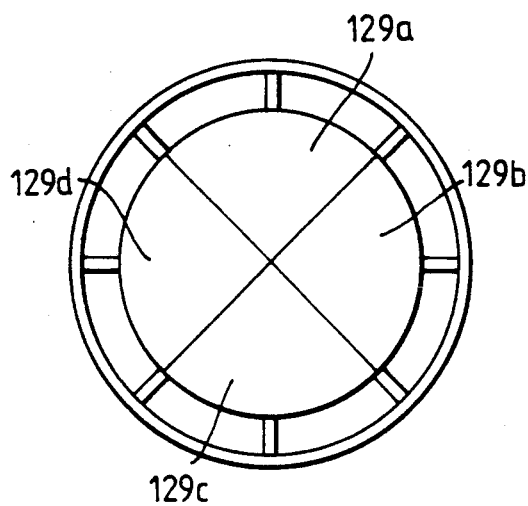
FIG. 11c is a plan view from below of the vessel of FIG. 10.

Referring now to FIG. 11c, there is shown a plan view of the bottom of the vessel. The four "clamshell" doors 129a-129d are shown closed.

Figure 11D:
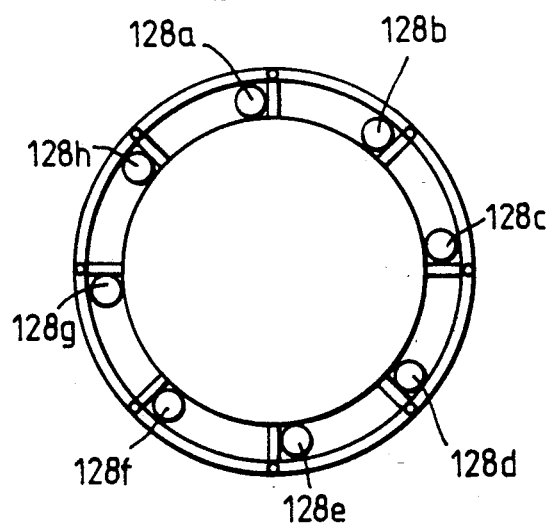
FIGS. 11d and 11e are, respectively, sectional views along the lines A—A and B—B of FIG. 10.

FIG. 11d is a section through the lower part of the vessel, along lines A—A of FIG. 10. The stored energy accumulators 128a-128h are attached to the side of the vessel as shown.

Figure 11E:
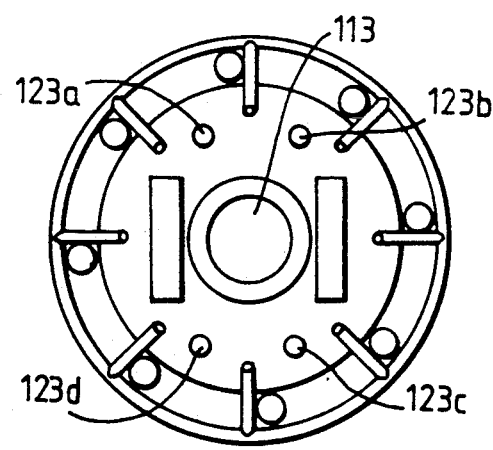

FIG. 11e is a section through the upper part of the vessel, along lines B—B of FIG. 10. The filling port 113, which may be sealed after the vessel is filled, is surrounded by the four one-way vents 123a-123d.

Figure 12:
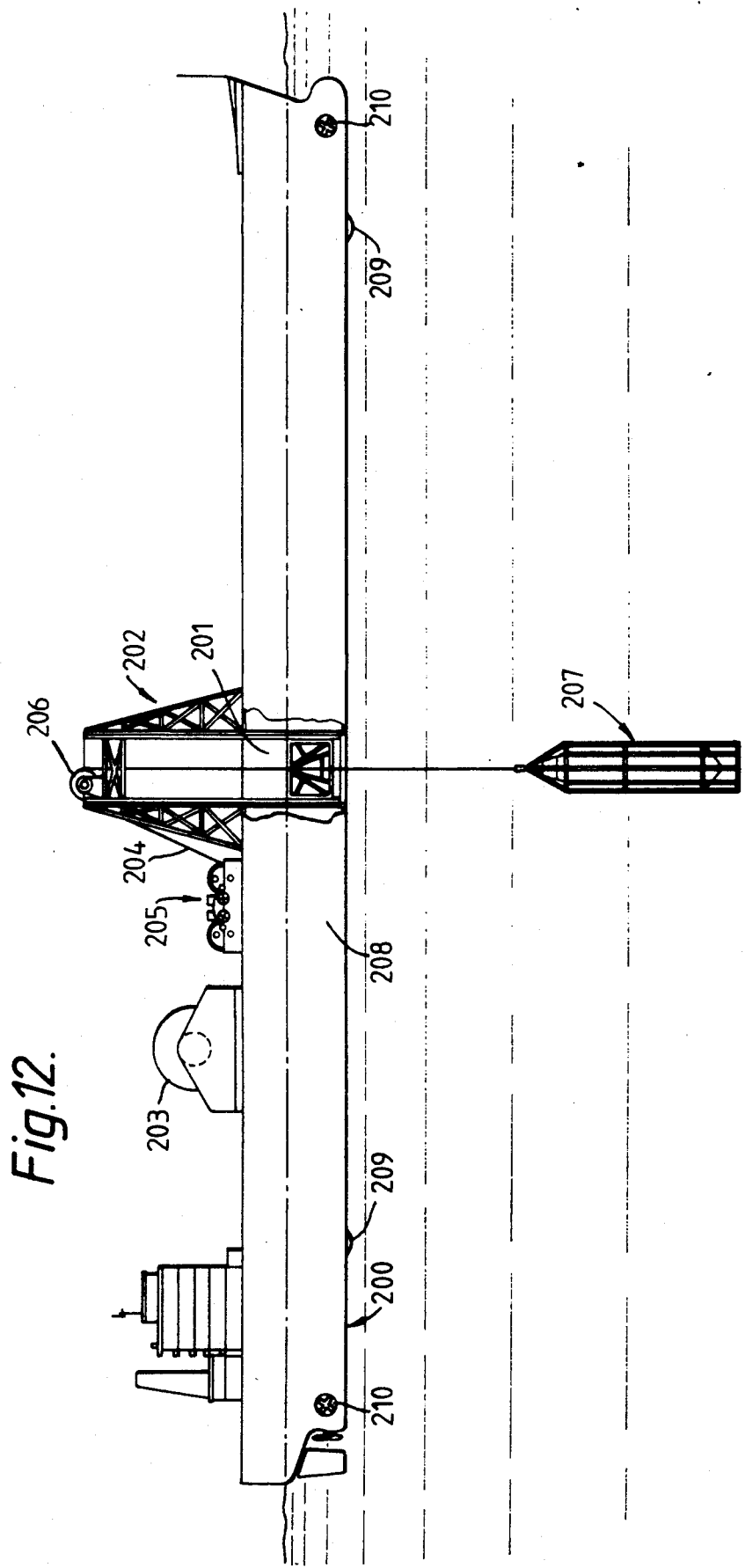
FIG. 12 illustrates schematically a marine system for waste disposal.

Referring now to FIG. 12, there is shown a marine system for disposal of material on subaqueous ground. This comprises a ship, 200, the hull of which includes a moon-pool 201. Over the moon-pool is mounted a gantry 202. On the deck of the ship there is a rope store 203, from which the rope 204 passes through a traction device 205 which allows the rope to run freely and is also able to hold the rope stationary and wind it back in again. The rope 204 passes from the traction device 205, via a wheel 206 mounted on top of the gantry 202, to a vessel 207 which is of the type described above with reference to FIGS. 10 and 11. The rope has a design strength sufficient to support the weight of a container and its contents (e.g. a breaking strain of several thousand tonnes) and should be designed to be capable of withstanding considerable stretching forces. The vessel may be held in the moon-pool 201 to be filled with waste material contained in the hold 208 of the ship. The ship has sensors 209 (e.g. sonar transponders) to measure the water depth below the hull. The ship also has a dynamic positioning system (not shown) in which satellite navigational aids are used to locate the ship accurately, and thrusters 210 are used to maintain the position of the ship over a selected site.

Referring now to FIG. 13, a schematic alternative embodiment is illustrated which is generally similar in construction and mode of operation to that of FIGS. 10 and 11; accordingly, only those aspects of this embodiment which differ from those of FIGS. 10 and 11 will now be described. Four wing-like members 134 (two of which are visible in the drawing) are attached to vessel 131 via a hinged mechanism 135. Each of the four wing-like members 134 carries, at its lower end, an outwardly extending flange 138. One-way vents at the top of the containment body are illustrated diagrammatically at 133. The centre of gravity of the containment body 131 is indicated at 139. The attachment point for wing-like members 134 is above the level of the centre of gravity 139.

In FIGS. 14 and 15, a device generally similar to that of FIG. 13 is shown, except that wing-like members 144 carry a plurality of baffle plates 150. These baffle plates may be of fixed orientation, or they may be arranged so as to be able to move from a feathered position to an opened position, providing a gentler deceleration than the wing-like members 134.

During descent of a filled vessel from the surface of the sea to a predetermined subaqueous location, typically to the sea bed, the vessel may initially be allowed to descend under "free fall" conditions while tethered to the surface ship through sling 108; the attitude of the vessel and its rate of descent being monitored by sensors (e.g. sonar transponder 110) and modified, where appropriate, by control devices such as motor pumps and water jets (not shown). With the embodiment of FIGS. 14 and 15, the rate of descent of the vessel under free fall conditions is reduced by virtue of the effect of baffles 150.

At a predetermined depth relative to the final destination of the vessel, the wing-like members (124, 134, 144) are extended outwardly as illustrated in FIGS. 11a and 15 to act as water brakes. These significantly decelerate the descent of the vessel, without destabilising it. Deceleration of the downward movement of the vessel can be achieved by applying tension to the rope connected to lifting/lowering sling 8, but in order to give economic operation, without undue strain on the rope, the wings (124, 134, 144) can be used to provide initial decelerating forces and thereby limit the strain on the rope. The rope may be coiled in a rope store in such a way that it may be uncoiled freely, but held taut at any time. The rope should be sufficiently long so as to allow the vessel to reach the sea bed. Once the vessel has been slowed to a relatively low velocity by wings (124, 134, 144), the rope itself may be used to take the strain until the vessel reaches its predetermined location just above the sea bed. Water jets 109 (see FIG. 10) are then operated and serve to blast a depression in the material of the sea bed thereby creating a hollow into which the material contained within the vessel may be deposited. Once the water jets have fulfilled this function, the doors 129a-129d in the lower end 103 of the containment body are opened, and waste material stored within the containment body (101, 131) leaves the body and settles on the sea bed. The one-way vents (123, 133) permit ingress of sea water which displaces the waste material leaving the body via its lower doors.

After the waste material has been emptied from the vessel, a flocculating agent is advantageously released over the mass of deposited material preferably from a height of about 15 feet above the deposited mass. This assists in ensuring that the waste material is in a cohesive state, and further assists in settling particles derived from the sea bed itself which were dislodged by the water jets in preparation for deposition of the waste material. It would also be possible to treat the waste material chemically before or during the descent of the vessel.

After depositing the waste material, the vessel is raised to the surface via the lifting/lowering sling 108

(see FIG. 10), during ascent to the surface, the doors at the lower end 103 of the containment body are kept open so that water is able to pass through the interior of the body via one-way vents such as 123a–123d of FIG. 11. This greatly decreases the vessel's resistance to movement, thus facilitating retrieval of the vessel by its mother ship. After retrieval, the vessel may be re-used.

In the embodiments described above, the means for controlling the wing-like members (124, 134, 144) and the baffles (150) are preferably arranged to ensure that all of the wings open exactly simultaneously and to exactly the same feathering angle and that the baffles do likewise; this maintains stability of the vessel during its descent.

The use of a vessel of the type shown in FIGS. 10 and 11 will now be illustrated by the following example:

EXAMPLE

A vessel with a containment body of capacity 1000 m$^3$ and weight on air of 177 tone is filled with waste material to a total weight of about 1530 tone. Allowing for hydrostatic displacement, the weight of the full vessel in water is about 370 tons. When the vessel is descending under "free fall" conditions, it reaches a terminal velocity of about 11 meters per second. When the eight wing-like members, which present a total area of about 1700 square feet, are moved to the open position, the vessel is decelerated to a new terminal velocity of about 6 meters per second, at which speed the rope is used for final deceleration to standstill. After deposition of the waste material, the vessel is drawn back up to the surface, with the one-way vents 123a–123d and clamshell doors 129a–129d open, at a speed of about 2000 feet per minute.

I claim:

1. A method of disposal of waste material on subaqueous ground substantially without said material coming into contact with surrounding water during descent, which comprises transporting said material to a location above a selected site for disposal, conveying said material in a vessel in a descending path to a level at, or close to, said subaqueous ground, and depositing said material out of said vessel onto said subaqueous ground, wherein said conveying step includes moving said vessel under free fall conditions for part of its descent to said level.

2. A method according to claim 1, wherein said vessel travels under free-fall conditions for a first period, and thereafter is decelerated during a second period as it approaches said level.

3. A method according to claim 2, wherein a depth of said subaqueous ground is calculated and wherein said first, free-fall period and said second, decelerating period are calculated as a function of said depth.

4. A method according to claim 3, wherein duration of said first and second periods are calculated before said vessel descends.

5. A method according to claim 3, wherein duration of said first and second periods are calculated while said vessel descends.

6. A method according to claim 1, wherein said vessel is held at said level at, or close to, said subaqueous ground by means of a rope, chain or similar attachment.

7. A method according to claim 1, wherein a hollow is formed in said subaqueous ground when said vessel is at said level and prior to depositing said material onto said subaqueous ground.

8. A method according to claim 1, wherein said waste material is subjected to processing prior to the descent of said material to said level.

9. A method according to claim 1, wherein said waste material is subjected to processing during the descent of said material to said level.

10. A method according to claim 1, wherein said waste material is subjected to processing after the deposition of said material onto said subaqueous ground.

11. A method according to claim 1, wherein vent apertures provided with non-return valves are accommodated in said vessel, which, is use, permit water to enter said vessel but prevent egress of said material therefrom.

12. A method according to claim 11, wherein said vent apertures are opened when said material is being deposited on said subaqueous ground.

13. A method according to claim 11, wherein after deposition of said material onto said subaqueous ground, the vessel is returned to a surface, and wherein said vent apertures remain open during its return to a surface.

14. A vessel for transporting material from a first location at a surface of a body of water to a second location at a predetermined subaqueous level, for example at a sea bed, which vessel comprises a generally cylindrical body comprising a containment area and having an opening at its upper end for receiving material which is to be transported by the vessel, and having at its lower end means for permitting egress of material held within the containment area once said vessel has reached its predetermined second location; wherein the vessel is provided, at a position intermediate its upper end and its centre of mass, with at least two wing members located on the exterior surface of the vessel at diametrally opposed positions; and is provided with means for pivoting said wing members between a first position in which they lie substantially flat against the vessel exterior and a second position in which they extend outwardly from the body of the vessel so as to present an increased surface area to surrounding water and to provide thereby a decelerating effect on the vessel motion when the vessel is moving downwardly within the body of water.

15. A vessel as claimed in claim 14, wherein said wing members are moved by means of hydraulic or pneumatic rams relative to the body of said vessel.

16. A vessel as claimed in claim 15, wherein the containment area of said vessel has its internal surface provided with a non-stick coating.

17. A vessel as claimed in claim 14, wherein baffles are provided on the outer surface of said vessel.

18. A vessel as claimed in claim 17, wherein said baffles are fixed.

19. A vessel as claimed in claim 17, wherein said vessel further includes means permitting active control of the orientation of the said baffles.

20. A vessel as claimed in claim 14, wherein baffles are provided on the outer surface of the wing-like members.

21. A vessel as claimed in claim 14, which further comprises a sonar transponder.

22. A vessel as claimed in claim 14, which further comprises means for calculating when said wing members are to be moved from their first position to their second position during descent of the vessel.

23. A vessel as claimed in claim 14, which further comprises a velocity detector.

24. A vessel as claimed in claim 14, which further comprises water jets affixed to said vessel.

25. A vessel as claimed in claim 14, which further comprises stored energy accumulators.

26. A vessel as claimed in claim 14, wherein the generally cylindrical body of said vessel is disposed within an open frame.

27. A vessel as claimed in claim 14, wherein said egress of material from within the said containment area is accomplished by means of a hinged door at the lower end of said vessel.

28. A vessel as claimed in claim 27, wherein said door is opened and closed by hydraulic or pneumatic rams.

29. A marine system for disposal of material on subaqueous ground substantially without said material coming into contact with surrounding water, which comprises a ship; a vessel carried by said ship adapted to transport said material to the subaqueous ground, said vessel being provided with a compartment to hold said material, means for releasing said material onto said subaqueous ground, and at least two wing members located on the exterior surface of the vessel at diametrally opposed positions; said wing members being provided with means for pivoting between a first position in which they lie substantially flat against the exterior of the vessel and a second position in which they extend outwardly from the body of the vessel so as to present an increased surface area to surrounding water and to provide thereby a decelerating effect on the motion of the vessel when the vessel is moving downwardly within the body of water.

30. A marine system as claimed in claim 29, wherein said vessel includes vent apertures provided with non-return valves which, in use, permit water to enter the vessel but prevent egress of said material therefrom.

31. A method of transferring material from a first location at the surface of a body of water to a second location at a predetermined subaqueous level, which method comprises: (a) placing the material into a vessel which comprises a containment area and having an opening at its upper end for receiving the material, and having at its lower end means for permitting egress of material held within the containment area once said vessel has reached a predetermined location, said vessel having at least two wing members; (b) allowing the vessel to fall freely from its first location through the body of water for a predetermined distance; (c) thereupon moving the wing members of said vessel from their first position towards their second position so as to decelerate the descent of the vessel; (d) controlling the rate of descent of said vessel to permit it to arrive gently at said second location; and (3) discharging the contents of the vessel.

32. A method of disposal of waste material on subaqueous ground substantially without said material coming into contact with surrounding water, which comprises transporting said material to a location above a selected site for disposal, conveying said material in a vessel in a descending path to a level at, or close to, said subaqueous ground, forming a hollow in said subaqueous ground by water jets carried by said vessel when said vessel is at said level, and after forming said hollow, depositing said material from said vessel onto said subaqueous ground, wherein said conveying step includes moving said vessel under free fall conditions for part of its descent to said level.

33. A method of disposal of waste material on subaqueous ground substantially without said material coming into contact with surrounding water, which comprises transporting said material to a location above a selected site for disposal, conveying said material in a vessel in a descending path to a level at, or close to, said subaqueous ground, and depositing said material from said vessel onto said subaqueous ground, wherein said conveying step includes moving said vessel under free fall conditions for part of its descent to said level, and wherein said waste material is subjected to chemical treatment prior to descent of said material to said level.

34. A method of disposal of waste material on subaqueous ground substantially without said material coming into contact with surrounding water, which comprises transporting said material to a location above a selected site for disposal, conveying said material in a vessel in a descending path to a level at, or close to, said subaqueous ground, and depositing said material from said vessel onto said subaqueous ground, wherein said conveying step includes moving said vessel under free fall conditions for part of its descent to said level, and wherein said waste material is subjected to chemical treatment comprising flocculation and/or coagulation prior to descent of said material to said level.

35. A method of disposal of waste material on subaqueous ground substantially without said material coming into contact with surrounding water, which comprises transporting said material to a location above a selected site for disposal, conveying said material in a vessel in a descending path to a level at, or close to, said subaqueous ground, and depositing said material from said vessel onto said subaqueous ground, wherein said conveying step includes moving said vessel under free fall conditions for part of its descent to said level, and wherein chemical reagents or additives are injected into said material through one or more nozzles either prior to or during descent of said material to said level.

36. A method of disposal of waste material on subaqueous ground substantially without said material coming into contact with surrounding water, which comprises transporting said material to a location above a selected site for disposal, conveying said material in a vessel in a descending path to a level at, or close to, said subaqueous ground, and depositing said material from said vessel onto said subaqueous ground, wherein said conveying step includes moving said vessel under free fall conditions for part of its descent to said level, and wherein said waste material is subjected to chemical treatment after deposition of said material onto said subaqueous ground by release of chemical reagents over said deposited material.

* * * * *